United States Patent
Oh et al.

(10) Patent No.: US 10,354,077 B2
(45) Date of Patent: Jul. 16, 2019

(54) PERMISSION CONTROL METHOD AND ELECTRONIC DEVICE OPERATING THE SAME

(71) Applicant: Samsung Electronics Co., Ltd., Gyeonggi-do (KR)

(72) Inventors: Myeong Jin Oh, Seoul (KR); Moon Kyung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 380 days.

(21) Appl. No.: 15/019,603

(22) Filed: Feb. 9, 2016

(65) Prior Publication Data
US 2016/0232365 A1     Aug. 11, 2016

(30) Foreign Application Priority Data
Feb. 9, 2015  (KR) .................. 10-2015-0019256

(51) Int. Cl.
| | | |
|---|---|---|
| *G06F 21/60* | (2013.01) | |
| *G06F 21/51* | (2013.01) | |
| *H04L 29/06* | (2006.01) | |

(52) U.S. Cl.
CPC ............ *G06F 21/604* (2013.01); *G06F 21/51* (2013.01); *H04L 63/101* (2013.01); *G06F 2221/2141* (2013.01); *G06F 2221/2145* (2013.01)

(58) Field of Classification Search
CPC ............. G06F 21/51; G06F 21/604; G06F 21/6218–21/6281; G06F 2221/2141; G06F 2221/2145; H04L 63/101; H04L 63/102
See application file for complete search history.

(56) References Cited

U.S. PATENT DOCUMENTS

| | | |
|---|---|---|
| 7,970,381 B2 | 6/2011 | Chesnutt et al. |
| 8,195,129 B2 | 6/2012 | Chesnutt et al. |
| 8,204,519 B2 | 6/2012 | Richardson et al. |
| 8,387,141 B1 | 2/2013 | Zhukov et al. |

(Continued)

FOREIGN PATENT DOCUMENTS

| | | |
|---|---|---|
| EP | 1 826 982 | 8/2007 |
| KR | 10-2014-0105318 | 9/2014 |
| WO | WO 2013/063791 | 5/2013 |

OTHER PUBLICATIONS

David Barrera et al., "Understanding and Improving App Installation Security Mechanisms through Empirical Analysis of Android", Proceedings of the Second ACM Workshop on Security and Privacy in Smartphones and Mobile Devices, SPSM '12, Jan. 1, 2012, 12 pages.

(Continued)

*Primary Examiner* — Kevin Bechtel
(74) *Attorney, Agent, or Firm* — The Farrell Law Firm, P.C.

(57) ABSTRACT

Disclosed is an electronic device including a memory configured to store inheritance limitation information of sharing permission owned by an application in a sharing permission relationship with an installed or executed application for sharing at least part of permission, and a processor functionally connected to the memory and set to process a sharing permission acquisition of the installed or executed application, based on the inheritance limitation information of the sharing permission when the application is installed or executed.

20 Claims, 13 Drawing Sheets

(56) References Cited

U.S. PATENT DOCUMENTS

| | | |
|---|---|---|
| 8,732,827 B1 | 5/2014 | Zhukov et al. |
| 8,832,847 B2 | 9/2014 | Anand et al. |
| 8,954,101 B2 | 2/2015 | Richardson et al. |
| 9,189,608 B2 | 11/2015 | Lee |
| 2007/0087765 A1 | 4/2007 | Richardson et al. |
| 2009/0047929 A1 | 2/2009 | Chesnutt et al. |
| 2010/0287598 A1 | 11/2010 | Korkishko et al. |
| 2011/0244830 A1 | 10/2011 | Chesnutt et al. |
| 2013/0055411 A1 | 2/2013 | Yang et al. |
| 2013/0143609 A1 | 6/2013 | Richardson et al. |
| 2013/0347096 A1 | 12/2013 | Lee |
| 2014/0018048 A1 | 1/2014 | Anand et al. |
| 2014/0053229 A1 | 2/2014 | Saib |
| 2014/0143843 A1* | 5/2014 | Scaife .................... H04L 63/20 726/5 |
| 2014/0245397 A1 | 8/2014 | Lim et al. |
| 2015/0256526 A1* | 9/2015 | Biegala .................. H04L 63/08 726/6 |
| 2015/0333955 A1 | 11/2015 | Richardson et al. |

OTHER PUBLICATIONS

European Search Report dated Apr. 18, 2016 issued in counterpart application No. 16154527.2-1870, 7 pages.
International Search Report dated Jun. 3, 2016 issued in counterpart application No. PCT/KR2016/001182, 14 pages.
European Search Report dated Dec. 12, 2016 issued in counterpart application No. 16154527.2-1870, 5 pages.
European Search Report dated Mar. 8, 2018 issued in counterpart application No. 16154527.2-1218, 4 pages.

* cited by examiner

<1001>

| SHARING PERMISSION | |
|---|---|
| SHARING PERMISSION | APPLICATION |
| LIMITATION | FIRST APPLICATION |
| SHARING | SECOND APPLICATION |
| PARTIAL LIMITATION | THIRD APPLICATION |
| ⋮ | ⋮ |

1010

<1003>

| SHARING PERMISSION | | |
|---|---|---|
| APPLICATION | PERMISSION | SETTING |
| FIRST APPLICATION | FIRST PERMISSION | SHARING PERMISSION |
| SECOND APPLICATION | SECOND PERMISSION | SHARING |
| THIRD APPLICATION | THIRD PERMISSION | SHARING PERMISSION |
| | FOURTH PERMISSION | SHARING |
| ⋮ | ⋮ | ⋮ |

1030

<1005>

| SHARING PERMISSION | |
|---|---|
| SHARING PERMISSION | APPLICATION |
| SHARING | FIRST APPLICATION |
| LIMITATION | SECOND APPLICATION |
| PARTIAL LIMITATION | THIRD APPLICATION |
| ⋮ | ⋮ |

1050

<1007>

| SHARING PERMISSION | | |
|---|---|---|
| APPLICATION | PERMISSION | SETTING |
| FIRST APPLICATION | FIRST PERMISSION | SHARING |
| SECOND APPLICATION | SECOND PERMISSION | SHARING PERMISSION |
| THIRD APPLICATION | THIRD PERMISSION | SHARING |
| | FOURTH PERMISSION | PERMISSION |
| ⋮ | ⋮ | ⋮ |

PERMISSION CONTROL METHOD AND ELECTRONIC DEVICE OPERATING THE SAME

PRIORITY

This application claims priority under 35 U.S.C. § 119(a) to a Korean Patent Application filed on Feb. 9, 2015 in the Korean Intellectual Property Office and assigned Serial no. 10-2015-0019256, the contents of which are incorporated herein by reference.

BACKGROUND

1. Field of the Disclosure

The present disclosure relates to permission control in an electronic device.

2. Description of the Related Art

In general, an electronic device performs various functions by executing applications installed on the electronic device. For example, the installed application may be executed in correspondence to a user input control or setting. In relation to application installation, a user may select, download and use a desired application through an application market. The application inherits the permission of another application, i.e, a sharing permission relationship, during an installation or operation process.

Since permission inheritance is valid even when application verification is not accompanied, various security issues relating to the sharing permission of application occur in the prior art. As such, there is a need in the art for a permission control method that eliminates such security issues.

SUMMARY

The present disclosure has been made to address the above-mentioned problems and disadvantages, and to provide at least the advantages described below.

Accordingly, an aspect of the present disclosure is to provide a permission control method for effectively limiting and operating sharing permission and an electronic device supporting the same.

In accordance with an aspect of the present disclosure, an electronic device includes a memory configured to store inheritance limitation information of sharing permission owned by an application, and a processor functionally connected to the memory, wherein the processor is set to process a sharing permission acquisition of an installed or executed application, based on the inheritance limitation information of the sharing permission owned by the application, and wherein the application has a sharing permission relationship with the installed or executed application.

In accordance with another aspect of the present disclosure, a permission control method includes receiving an application installation or execution request by a processor of an electronic device, determining, by the processor, inheritance limitation information of sharing permission owned by an application in a sharing permission relationship, and processing, by the processor, a sharing permission acquisition of an installed or executed application, based on the inheritance limitation information of the sharing permission, wherein the application has the sharing permission relationship with the installed or executed application.

BRIEF DESCRIPTION OF THE DRAWINGS

The above and other aspects, features, and advantages of the present disclosure will be more apparent from the following detailed description taken in conjunction with the accompanying drawings, in which:

FIG. 10 illustrates a screen interface of an electronic device according to embodiments of the present disclosure;

DETAILED DESCRIPTION OF EMBODIMENTS OF THE DISCLOSURE

Figure 1:
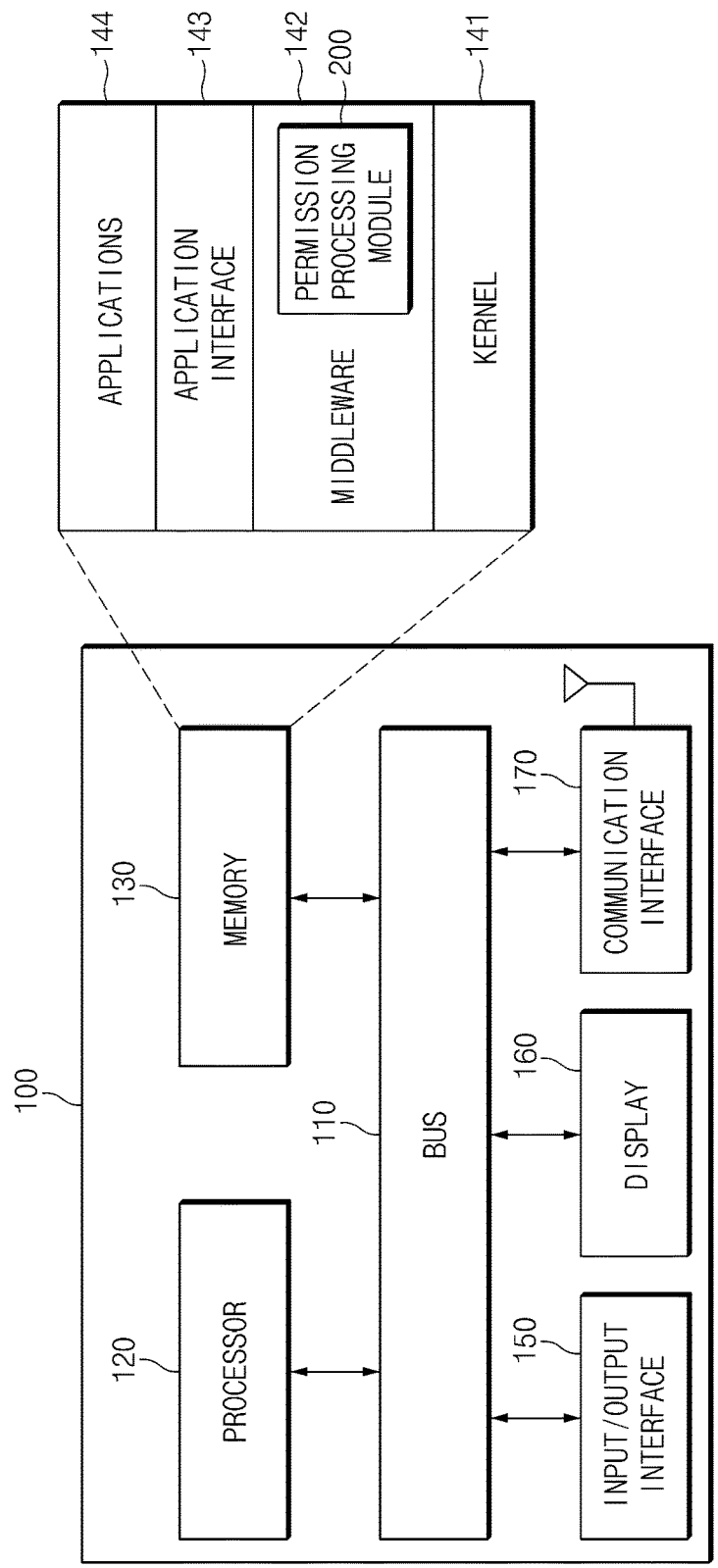
FIG. 1 illustrates an electronic device relating to permission control according to embodiments of the present disclosure.

Hereinafter, embodiments of the present disclosure are disclosed with reference to the accompanying drawings. However, embodiments of the present disclosure are not limited to a specific embodiment and it should be understood that the present disclosure covers all the modifications, equivalents, and/or alternatives of this disclosure provided they come within the scope of the appended claims and their equivalents. With respect to the descriptions of the drawings, like reference numerals refer to like elements. Descriptions of known functions and/or configurations will be omitted for the sake of clarity and conciseness.

The terms "include," "comprise," and "have", or "may include," or "may comprise" and "may have" used herein indicate disclosed functions, operations, or existence of elements but do not exclude other functions, operations or elements.

For instance, the expressions "A or B", or "at least one of A or/and B" may indicate include A, B, or both A and B. For instance, the expressions "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of embodiments of the present disclosure, but do not limit the elements. The expressions may be used to distinguish one element from another element. For instance, "a first user device" and "a second user device" may indicate different users regardless of the order or the importance. For example, a first component may be referred to as a second component and vice versa without departing from the scope of the present disclosure.

In embodiments of the present disclosure, it will be understood that when a component, such as a first component, is referred to as being "(operatively or communicatively) coupled with/to" or "connected to" another component, such as a second component, the component may be directly connected to the other component or connected through another component (for example, a third component). In embodiments of the present disclosure, it will be understood that when a first component is referred to as being "directly connected to" or "directly access" a second component, a third component does not exist between the first component and the second component.

The expression "configured to" used in embodiments of the present disclosure may be interchangeably used with "suitable for", "having the capacity to", "designed to", "adapted to", "made to", or "capable of" according to a situation, for example. The term "configured to" may not necessarily indicate "specifically designed to" in terms of hardware. Instead, the expression "a device configured to" in some situations may indicate that the device and another device or part are "capable of". For example, "a processor configured to perform A, B, and C" in a phrase may indicate a dedicated processor or embedded processor for performing a corresponding operation or a generic-purpose central processing unit (CPU) or application processor (AP) for performing corresponding operations by executing at least one software program stored in a memory device.

Terms used in embodiments of the present disclosure are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. Even the terms defined in this specification cannot be interpreted as excluding embodiments of the present disclosure.

Electronic devices according to embodiments of the present disclosure may include at least one of smartphones, tablet personal computers (PCs), mobile phones, video phones, electronic book (e-book) readers, desktop PCs, laptop PCs, netbook computers, workstation server, personal digital assistants (PDAs), portable multimedia player (PMPs), MP3 players, mobile medical devices, cameras, and wearable devices such as smart glasses, head-mounted-devices (HMDs), electronic apparel, electronic bracelets, electronic necklaces, electronic appcessories, electronic tattoos, smart mirrors, and smart watches.

According to some embodiments of the present disclosure, an electronic device may be at least one of smart home appliances such as televisions, digital video disk (DVD) players, audios, refrigerators, air conditioners, cleaners, ovens, microwave ovens, washing machines, air cleaners, set-top boxes, home automation control panels, security control panels, TV boxes such as Samsung HomeSync™, Apple TV™ or Google TV™, game consoles such as Xbox™ and PlayStation™, electronic dictionaries, electronic keys, camcorders, and electronic picture frames.

According to some embodiments of the present disclosure, an electronic device includes at least one of various medical devices supporting call forwarding service, such as various portable measurement devices including glucometers, heart rate meters, blood pressure meters, and temperature meters, magnetic resonance angiography (MRA) devices, magnetic resonance imaging (MRI) devices, computed tomography (CT) devices, medical imaging devices, and ultrasonic devices, navigation devices, global positioning system (GPS) receivers, event data recorders (EDRs), flight data recorders (FDRs), vehicle infotainment devices, marine electronic equipment such as marine navigation systems and gyro compasses, avionics, security equipment, vehicle head units, industrial or household robots, financial institutions' automatic teller's machines (ATMs), or stores' point of sales (POS) or Internet of Things (IoT), such as light bulbs, various sensors, electric or gas meters, sprinkler systems, fire alarms, thermostats, street lights, toasters, exercise equipment, hot water tanks, heaters, and boilers.

In embodiments of the present disclosure, an electronic device includes at least one of part of furniture or buildings/structures supporting call forwarding service, electronic boards, electronic signature receiving devices, projectors, and various measuring instruments, such as water, electricity, gas, or radio signal measuring instruments. An electronic device according to embodiments of the present disclosure may be one of the above-mentioned various devices or a combination thereof, and may be a flexible electronic device. An electronic device according to an embodiment of the present disclosure is not limited to the above-mentioned devices and may include a new type of an electronic device according to technological advances.

The term "user" in this disclosure may refer to a person using an electronic device or a device using an electronic device, such as an artificial intelligence electronic device.

FIG. 1 illustrates an electronic device relating to permission control according to embodiments of the present disclosure.

Referring to FIG. 1, an electronic device 100 includes a bus 110, a processor 120, a memory 130, an input/output interface 150, a display 160, and a communication interface 170.

The electronic device 100 checks a database relating to sharing permission during an application installation process or an installed application operation process and processes to allow a permission operation limited to sharing permission in correspondence to a check result. The sharing permission includes permission for inheriting and operating permission between applications set with a sharing permission relationship.

The electronic device 100 manages an application list requiring the inheritance limitation of sharing permission as a sharing permission information list in correspondence to control information received externally or from an application installation process. The electronic device 100 limits an application operation based on the sharing permission information list.

The bus 110 includes a circuit for connecting the components 110 to 170 to each other and delivering a communication between the components 110 to 170. For example, the bus 110 delivers an application package received through the communication interface 170 to the memory 130 and supports a signal delivery relating to the installation of the application package stored in the memory 130. The bus 110 processes the delivery of information, such as type information of an application or sharing permission relating to the sharing permission of application. The bus 110 supports the delivery of list information, such as a white list relating to the type of an application that limits the inheritance of sharing permission and delivery of list information, such as a black list relating to an item specific inheritance limitation of sharing permission.

The processor 120 includes at least one of a CPU, an AP, and a communication processor (CP). The processor 120 executes calculation or data processing for control and/or communication of at least one other component of the electronic device 100. According to an embodiment of the present disclosure, the processor 120 processes the reception of an application package to be installed on the electronic device 100, the installation of a received application package, and the processing, delivering, and storing of signals necessary for an operation of an installed application. The processor 120 performs processing on the loading of a permission processing module 200 stored in the memory 130 and a sharing permission inheritance control based on the loaded permission processing module 200. The processor 120 provides at least one processor for operating the permission processing module 200, which may be hardware or a combination of hardware and software. According to the present disclosure, the permission processing module 200 may be formed by at least one processor.

The memory 130 includes volatile and/or nonvolatile memory, stores instructions or data relating to at least one other component of the electronic device 100, and stores software and/or a program 140. The program 140 includes a kernel 141, middleware 142, an application programming interface 143, and applications 144. At least part of the kernel 141, the middleware 142, or the application interface 143 may be referred to as an operating system (OS).

The kernel 141 controls or manages system resources, such as the bus 110, the processor 120, and the memory 130, used for performing operations or functions implemented in other programs, such as the middleware 142, the application interface 143, or the applications 144, and provides an interface for controlling or managing system resources by accessing an individual component of the electronic device 100 from the middleware 142, the application interface 143, or the applications 144.

The middleware 142 serves as an intermediary for exchanging data as the application interface 143 or the applications 144 communicate with the kernel 141. In relation to job requests received from the applications 144, the middleware 142 performs a control, such as scheduling or load balancing, for the job requests by using a method of assigning a priority for using a system resource of the electronic device 100 to at least one application program among the applications 144.

The middleware 142 stores information relating to the permission processing module 200, which is loaded into the processor 120 in relation to an operation of the electronic device 100 so that an operation relating to permission inheritance or permission usage processing is performed. Alternatively, the permission processing module 200 may be prepared as a separate processor or mounted in an embedded form in a specified processor to be responsible for function processing. Accordingly, the permission processing module 200 may be prepared in at least one of a hardware module and a software module.

The application interface 143, which allows the applications 144 to control a function provided from the kernel 141 or the middleware 142, includes at least one interface or instruction for file control, window control, image processing, or character control.

The applications 144 relate to at least one function provided to a user through an operation of the electronic device 100, may be mounted during the manufacturing process of the electronic device 100, and may be mounted as received from a server device or another external electronic device during or after sale of the electronic device 100. The applications 144 use at least one permission during a process for executing a specified function based on the electronic device 100.

The permission includes control permission for accessing and using at least part of at least one component included in the electronic device 100. Alternatively, the permission includes access permission for at least part of data used through at least one component included in the electronic device 100. Such permission varies according to the type of an application, the policy of a manufacturer for manufacturing an electronic device, and the application design.

The permission of a specific application may be obtained from sharing permission inheritance setting information of another application defined as a sharing permission relationship, such as a shared unique identification (UID). For example, the sharing permission includes permission for inheriting permission owned or obtained by another application as sharing and using the permission. According to embodiments of the present disclosure, the electronic device 100 performs list management in relation to sharing permission inheritance setting and limits a sharing permission relating to a specified application not to be inherited. Alternatively, based on a managed list in relation to a sharing permission inheritance setting, the electronic device 100 limits part but not all of a sharing permission relating to a specified application to be inherited to another application or limits at least part of sharing permission not to be inherited to another application.

The input/output interface 150 serves as an interface for delivering instructions or data inputted from a user or another external device to other components of the electronic device 100. The input/output interface 150 outputs instructions or data received from other components of the electronic device 100 to a user or another external device, and includes at least one physical button, touch button, touch pad, or touch screen, as well as an input means by an electronic pen and an audio collection device for collecting audio signals.

The input/output interface 150 further includes an audio output device, a lamp, and a vibration output device. When an information output relating to a sharing permission operation is requested, the input/output interface 150 outputs corresponding information through at least one of an audio output device, a lamp, and a vibration output device. For example, the input/output interface 150 outputs, through an audio output device, audio data relating to guide information including at least one of sharing permission inheritance, a sharing permission inheritance limitation, and access processing on a sharing permission not to be inherited. Alternatively, the input/output interface 150 performs specified lamp blinking in relation to the guide information, and outputs a specified pattern of vibration in relation to the guide information.

The display 160 includes a liquid crystal display (LCD), a light emitting diode (LED) display, an organic light emitting diode (OLED) display, a microelectromechanical systems (MEMS) display, or an electronic paper display. The display 160 displays various content to a user, and includes a touch screen adapted to receive a touch, gesture, proximity, or hovering input by using an electronic pen or a user's finger, for example.

The display 160 outputs at least one screen relating to a sharing permission operation, such as at least one application installation or execution. The display 160 outputs a screen relating to a sharing permission inheritance setting, sharing permission inheritance (or sharing) and sharing permission inheritance limitation, relating to an installed or executed application. The display 160 outputs a screen relating to a sharing limitation application list or a permission limitation list relating to a sharing permission setting.

The communication interface 170 sets communication between the electronic device 100 and an external device. For example, the communication interface 170 communicates with an external device in connection to a network through wired communication, or through wireless communication such as long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM) as a cellular communication protocol. The wired communication, for example, includes at least one of universal serial bus (USB), high definition multimedia interface (HDMI), recommended standard 232 (RS-232), and plain old telephone service (POTS). The network includes at least one telecommunications network, and at least one of computer network such as local area network (LAN) or wide area network (WAN), the Internet, and a telephone network.

The communication interface 170, for example, establishes a communication channel with a server device or an external electronic device providing an application package. The communication interface 170 receives an application package from the server device or the external electronic device and delivers the application package to the memory 130. According to embodiments of the present disclosure, the communication interface 170 receives application list information relating to a sharing permission control from a server device or an external electronic device. Alternatively, the communication interface 170 receives permission limitation list information relating to a sharing permission control from a server device or an external electronic device. The received list information may be delivered to or stored in the memory 130 or may be used for updating existing information.

Figure 2:
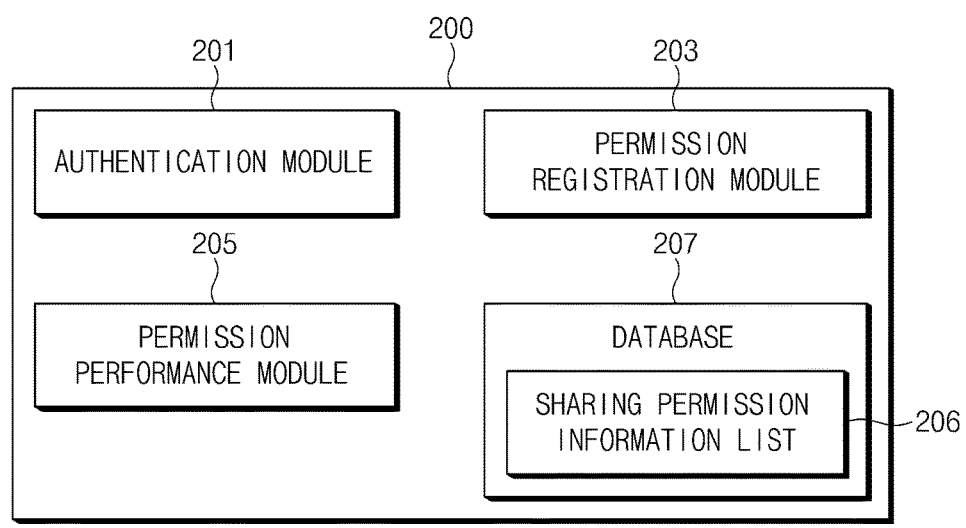
FIG. 2 illustrates a permission processing module according to embodiments of the present disclosure.

FIG. 2 illustrates a permission processing module according to embodiments of the present disclosure.

Referring to FIG. 2, the permission processing module 200 includes an authentication module 201, a permission registration module 203, a permission performance module 205, and a database 207.

The authentication module 203 determines the validity of permission setting of an application. For example, the authentication module 203 determines whether permission information included in an application is modified or changed. When permission information of an application is modified or changed arbitrarily, the authentication module 203 determines the permission setting of a corresponding application is invalid.

According to embodiments of the present disclosure, when an application is a specified preload application or a specific application signed by a given specific key, the authentication module 203 determines that the permission of a corresponding application is valid. When the authentication module 203 has a permission setting token relating to a permission setting, the authentication module 203 determines the validity of a corresponding permission setting token. The permission setting token is data for defining a permission range used by an application, and includes permission information such as permission usable in an application, a validity period, and authentication information.

If the authentication module 203 determines that the permission setting of the application is valid, the permission registration module 203 processes the permission registration of the application in correspondence to at least one of the type of an application installed, a control by a manager, or an approval by a user, for example. According to an embodiment of the present disclosure, when sharing permission is a first type, such as a normal rating or a dangerous rating, the permission registration module 203 registers a specified sharing permission in relation to the application without additional conditions. When the sharing permission requested by the application for registration is a second type, such as a signature rating or signature/system rating, the permission registration module 203 determines whether to register the sharing permission based on the sharing permission information list 206 stored in the database 207. The sharing permission information list 206 includes specified index information such as application type information, information on an application providing device, and application identification information, and sharing permission setting information of an application.

According to an embodiment of the present disclosure, when an application installation or execution request has occurred, the permission registration module 203 determines whether the application has a sharing permission relationship with an application listed in the sharing permission information list 206. When the application has the sharing permission relationship with an application listed in the sharing permission information list 206, the permission registration module 203 registers the permission of a related application after processing at least part of the sharing permission not to be inherited. According to an embodiment of the present disclosure, when the application having the sharing permission relationship with the installed application is not included in the sharing permission information list 206, the permission registration module 203 performs a control to list application related index information and sharing permission setting information in the sharing permission information list 206. The index information and sharing permission setting information newly listed in the sharing permission information list 206 is used to limit sharing permission inheritance during an installation process of another application having a sharing permission relationship with a related application.

The permission performance module 205 controls processing according to an application execution and a permission use request. For example, when a specified permission use relating to an application execution is requested, the permission performance module 205 determines whether the permission of a corresponding application is obtained. If there is no specified permission or limitation set in relation to the permission of a corresponding application, the permission performance module 205 performs processing to reject or ignore the permission use request of an application. The permission performance module 205 performs a control to output a notification on rejection or ignoring of the permission use request.

When there is a specified permission or limitation is not set, the permission performance module 205 accepts a request according to a corresponding permission use and processes related service or function execution. For example, when a fingerprint sensor use permission is requested from an application having a fingerprint sensor related permission, the permission performance module 205 processes an access allowance of information relating to a processor allocation for a fingerprint sensor use or operation.

According to an embodiment of the present disclosure, when a biometric information use permission is requested from an application having a service permission relating to a biometric information function operation, the permission performance module 205 processes a processor allocation relating to a biometric information related sensor operation and a biometric information access allowance.

The database 207 stores permission information allowed for each application, such as an installed application list and the type of permission allowed for each application. The database 207 further stores developer information and period information of an application. The database 207 may be implemented in one file form of continuously listing application list related information, and may be synchronized or updated through an external electronic device, such as the server 106. The database 207 includes the sharing permission information list 206 relating to sharing permission. The sharing permission information list 206 stores at least one of application identification information requested for sharing permission not to be inherited, requested for only a specified sharing permission to be inherited, and requested for a specified sharing permission not to be inherited.

Figure 3:
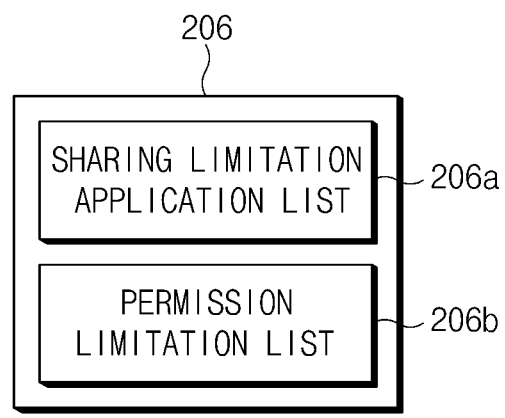
FIG. 3 illustrates a sharing permission information list according to embodiments of the present disclosure.

FIG. 3 illustrates a sharing permission information list according to embodiments of the present disclosure.

Referring to FIG. 3, a sharing permission information list 206 includes a sharing limitation application list 206a and a permission limitation list 206b relating to applications for limiting sharing permission.

The sharing limitation application list 206a, for example, includes specified application list information, which is registered in the sharing limitation application list 206a and is used for limiting sharing permission inheritance. For example, while another application having a sharing permission relationship with an application registered in the sharing limitation application list 206a is installed or executed, the sharing permission of the application registered in the sharing limitation application list 206a may not be inherited to the other application or may not be used.

The permission limitation list 206b includes information set to allow another application in a sharing permission relationship to inherit some of the permissions of a specified application. Alternatively, the permission limitation list 206b includes a list set to allow another application in a sharing permission relationship not to inherit some of the permissions of a specified application.

For example, an application A is in a state that obtains permission to use first permission, second permission, and third permission. In relation to the permission acquisition of application A, the electronic device 100 defines (for example, defines a manifest file relating to permission definition) a permission to be used through authentication, such as automatic or signature key authentication, according to the type of the application A or the type of an obtained permission. An application B having a sharing permission relationship with application A is installed or executed. When application A is registered in the sharing limitation application list 206a, application B does not inherit the permission of A application in a sharing permission relationship. When application A is registered in the permission limitation list 206b, application B inherits some permissions according to a state of being registered in the permission limitation list 206b. For example, the first permission among the permissions of application A is set to be inherited by other applications in a sharing permission relationship and information set for the remaining second and third permissions not to be inherited are registered in the permission limitation list 206b. Accordingly, while application B is installed and executed, the second permission and the third permission are obtained and used.

According to embodiments of the present disclosure, the electronic device 100 operates the sharing limitation application list 206a or the permission limitation list 206b according to a user setting or a manager setting relating to sharing permission inheritance limitation. Alternatively, the electronic device 100 processes, permission inheritance according to a sharing limitation or setting based on the sharing limitation application list 206a and processes the permission inheritance of a partially limited set application based on the permission limitation list 206b.

The following are aspects according to embodiments of the present disclosure.

An electronic device includes a memory configured to store inheritance limitation information of sharing permission owned by an application in a sharing permission relationship for sharing at least part of permission, and a processor functionally connected to the memory. The processor is set to process a sharing permission acquisition of an installed or executed application, based on the inheritance limitation information of sharing permission when an application is installed or executed.

The processor processes the installed application or the executed application not to obtain sharing permission owned by an application in a sharing permission relationship according to the inheritance limitation information of sharing permission, or processes the installed application or the executed application to obtain part but not all of the sharing permission owned by an application in the sharing permission relationship according to the inheritance limitation information of the sharing permission.

The processor stores at least one of a sharing limitation application list including applications for limiting a sharing permission inheritance and a permission limitation list including permission specific inheritance setting information included in an application.

The processor may update the inheritance limitation information of sharing permission in correspondence to received information including an inheritance setting change of sharing permission of an application in a sharing permission relationship.

The processor outputs a specified event when a use request not to inherit sharing permission or a limited sharing permission has occurred.

The processor transmits a report for requesting a not to inherit sharing permission update to a specified server device.

When an application in a sharing permission relationship does not have the inheritance limitation information of sharing permission, the processor registers the installed application or the executed application item in the inheritance limitation information of sharing permission in relation to a sharing permission inheritance limitation of the installed application or the executed application.

When a type of a permission to be obtained by the installed application or the executed application is a specified first type of permission, the processor obtains a permission of the installed application or the executed application without determining the inheritance limitation information of sharing permission.

When a type of a permission to be obtained by the installed application or the executed application is a specified second type of permission, the processor obtains permission of the installed application or the executed application based on the inheritance limitation information of sharing permission.

According to a type of the installed application or the executed application, the processor automatically provides a permission requested by the installed application or the executed application or provides permission based on an information confirmation relating to the sharing permission inheritance limitation.

Figure 4:
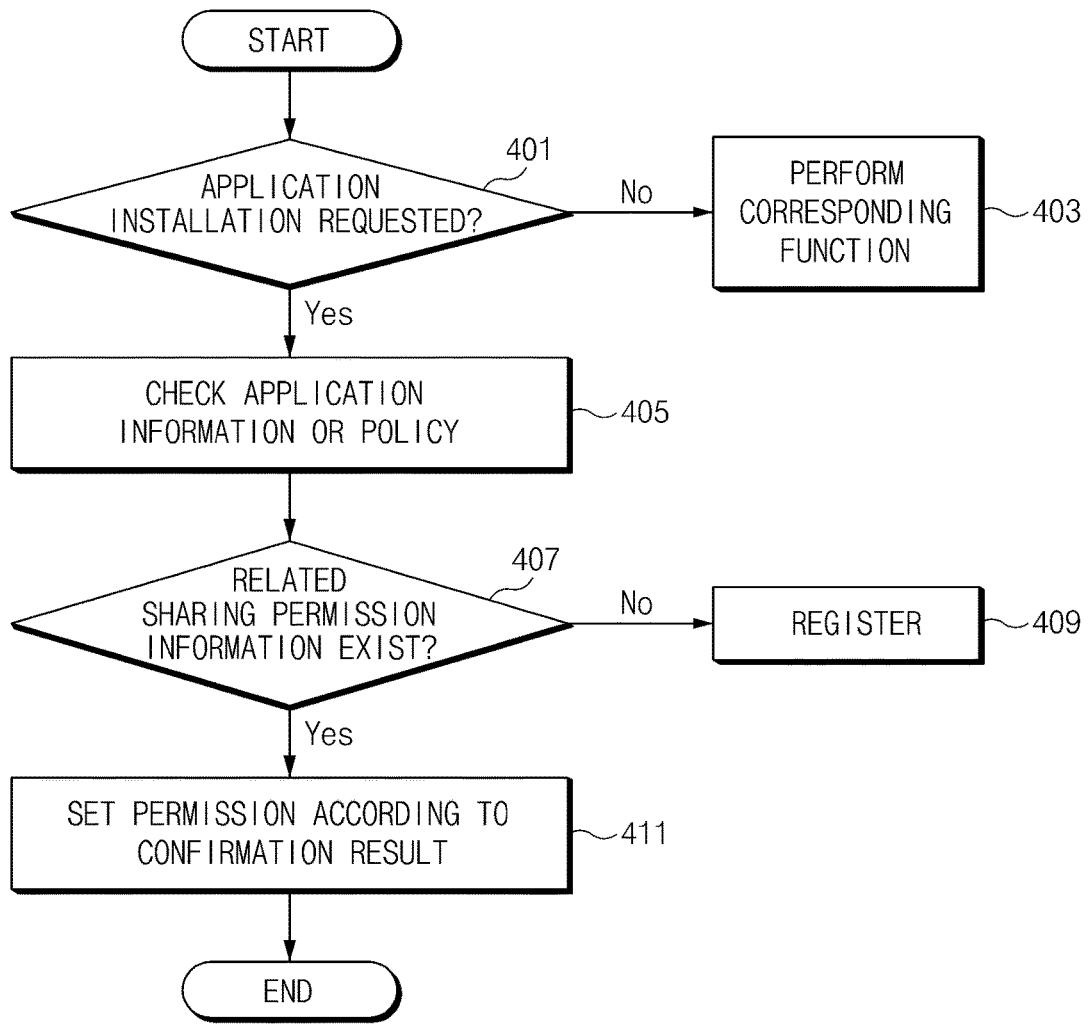
FIG. 4 illustrates an electronic device operating method relating to permission setting when application is installed according to embodiments of the present disclosure.

FIG. 4 illustrates an electronic device operating method relating to permission setting when application is installed according to embodiments of the present disclosure.

Referring to FIG. 4, in step 401, when an event has occurred, the permission processing module 200 of the electronic device 100 determines whether the occurring event relates to an application installation request. For example, the permission processing module 200 determines whether an application package reception event specified in relation to application installation has occurred. Alternatively, the permission processing module 200 determines whether an event relating to the installation of a stored application package has occurred. If an event relating to an application installation request has not occurred, in step 403, the permission processing module 200 performs a specified function according to an event type or performs a function set to be performed by an event.

If an event relating to an application installation request has occurred, in step 405, the permission processing module 200 determines at least one of application information and an application policy. For example, the permission processing module 200 determines the identification information of an application, and policy information relating to an application to be installed. According to an embodiment of the present disclosure, the policy information includes information for determining whether to limit sharing permission inheritance in correspondence to the type of an application. When an application is a first type, the policy information includes information for determining to obtain sharing permission without an additional limitation. When an application is a second type, the policy information includes information for determining to limit permission acquisition according to a specified sharing permission inheritance limitation. The type of an application may be designated in advance, or may be changed in terms of the number of types. During an application type change, corresponding policy information may be changed, as obtained from an external electronic device or a server device or may be referred by a database stored in the electronic device 100. Alternatively, policy information may be changed by a user input.

In step 407, the permission processing module 200 determines whether there is installation requested application related sharing permission information. For example, if there is no information on an application in a sharing permission relationship, in step 409, the permission processing module 200 processes permission registration set in an application. For example, when an application in the sharing permission relationship is not in the sharing limitation application list 206a, the permission processing module 200 registers and processes the application item in the sharing limitation application list 206a in relation to the sharing permission inheritance limitation of the application. During this operation, the permission processing module 200 registers and processes the identification information of an installed application in the sharing limitation application list 206a or the permission limitation list 206b.

The identification information registration of the second type application may be adjusted according to a specified policy or a user setting. For example, according to an application type, the identification information may be registered in the sharing limitation application list 206a or the permission limitation list 206b. When the identification information is registered in the permission limitation list 206b, some permissions included in an application may be set to be inherited or not to be inherited based on a sharing permission relationship.

If there is application related sharing permission information, in step 411, the permission processing module 200 performs permission setting processing according to an information check result. For example, when the first type application has no additional sharing permission inheritance limitation, the permission processing module 200 determines whether there is an application having a sharing permission relationship with a corresponding application. When there is an application in a sharing permission relationship, the permission processing module 200 obtains permission owned by the application in the sharing permission relationship, and registers and processes the obtained permission as the permission of an application to be installed.

When the second type application has a sharing permission inheritance limitation, the permission processing module 200 determines application information of a sharing permission relationship. For example, the permission processing module 200 determines at least one of the sharing limitation application list 206a and the permission limitation list 206b.

When an application in the sharing permission relationship is included in the permission limitation list 206b, the permission processing module 200 performs a control to register some sharing permissions owned by the application of the sharing permission relationship in relation to an installed application according to information set in the permission limitation list 206b. Additionally or alternatively, the permission processing module 200 registers and processes a permission owned by an installed application in the sharing limitation application list 206a or the permission limitation list 206b based on a specified condition, which includes at least one of a specified policy, a user input, and a control of an external electronic device.

Figure 5:
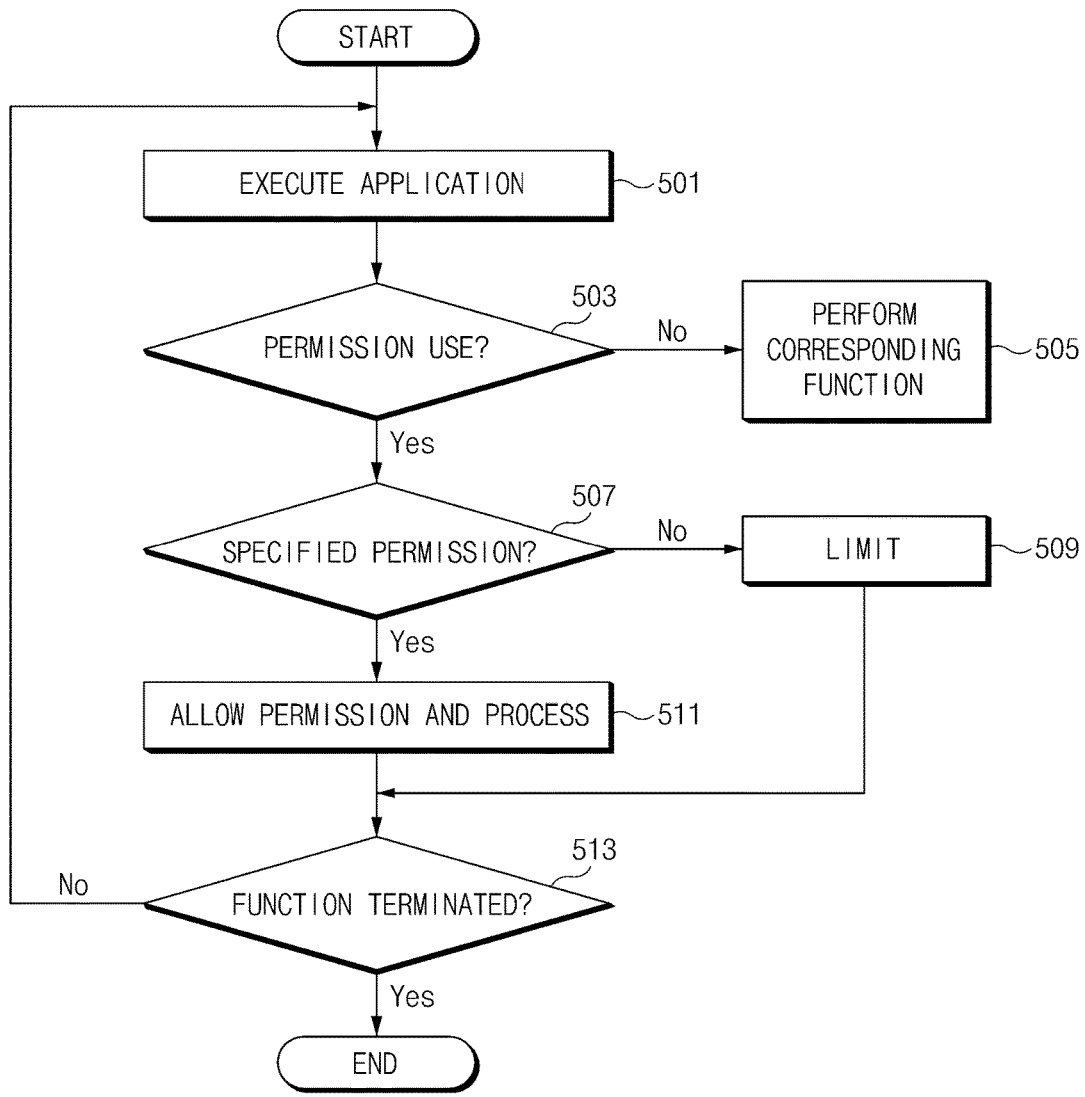
FIG. 5 illustrates an electronic device operating method relating to permission operation when application is executed according to embodiments of the present disclosure.

FIG. 5 illustrates an electronic device operating method relating to permission operation when application is executed according to embodiments of the present disclosure.

Referring to FIG. 5, in step 501, the electronic device 100 performs application execution related processing in correspondence to pre-scheduled information or a user input. For example, the electronic device 100 performs a control to output a screen according to application execution or output audio data.

In step 503, when an event has occurred, the permission processing module 200 of the electronic device 100 determines whether a permission use related event has occurred. When a permission use related event has not occurred, in step 505, the permission processing module 200 processes an application execution related function performance according to a corresponding event type. For example, the permission processing module 200 processes an application related specific function execution or application switching in correspondence to an event type.

When a permission use related event has occurred, in step 507, the permission processing module 200 determines whether an operation of a specified permission is requested, such as a permission that a corresponding application uses as sharing permission. For example, the permission processing module 200 determines registration information that registers permissions used by a corresponding application and, based thereon, determines whether a request relates to permission obtained by an application.

When an application requests the sharing permission of another application, the permission processing module 200 determines whether an application in a sharing relationship with a corresponding application is in the sharing limitation application list 206a. When the request relates to the sharing permission of an application in the sharing limitation application list 206a, the permission processing module 200 determines the request as being for an unspecified permission.

When the permission operation is not specified, such as in a use request of a permission that a corresponding application does not obtain, an operation of a permission not used as sharing permission, or when sharing permission is set not to operate by a setting, in step 509, the permission processing module 200 limits the use for sharing permission, in which case the permission processing module 200 performs a control to output guide information for stipulating that a corresponding application cannot use the use requested permission. The permission processing module 200 performs a control on a procedure, such as the installation of a specified application and a specified permission use request report, necessary for using a permission that a corresponding application requests for use. During this operation, the permission processing module 200 controls a necessary procedure related guide information output.

When an operation request of a specified permission is made, in step 511, the permission processing module 200 performs permission allowance and processing. For example, the permission processing module 200 supports a requested permission related service such as fingerprint recognition, biometric information collection service, credit card wallet, and near field communication (NFC)-based communication service. Alternatively, the permission processing module 200 supports the allocation of a processor for using a specified function of an application, such as a security or authentication function. Alternatively, the permission processing module 200 permits a specified information access of an application according to permission processing.

In step 513, it is determined whether an event relating to a function termination of an application has occurred. If no application function termination event has occurred, the electronic device 100 returns to step 501 and re-performs the method. If an application function termination event has occurred, the electronic device 100 performs a control to terminate the application function and transitions to a specified state.

Figure 6:
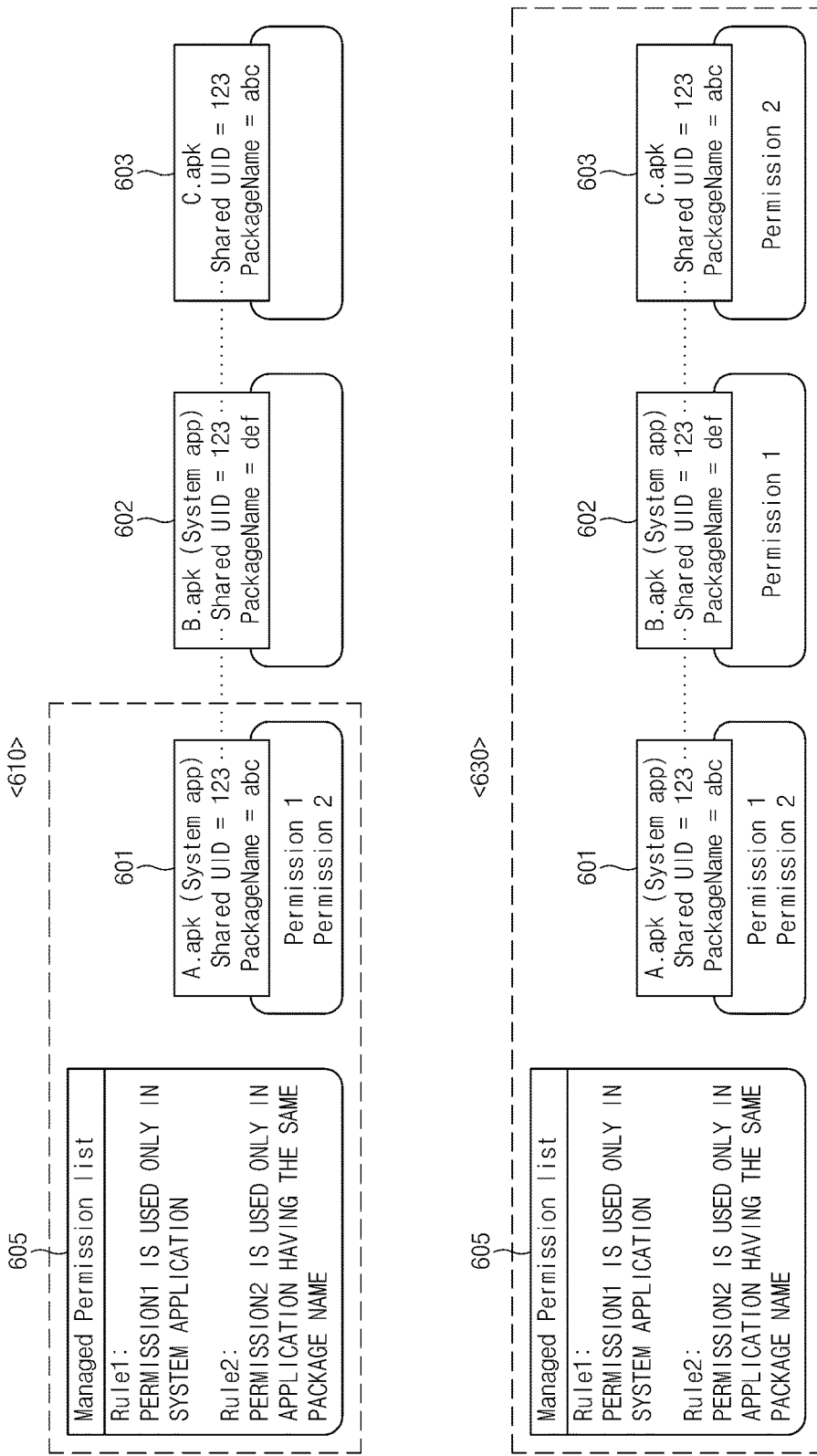
FIG. 6 illustrates sharing permission inheritance limitation and inheritance according to embodiments of the present disclosure.

FIG. 6 illustrates a sharing permission inheritance limitation and inheritance according to embodiments of the present disclosure.

Referring to FIG. 6, as shown in state 610, the electronic device 100 includes sharing permission rule information 605 and a first application 601. The sharing permission rule information 605 includes policy information relating to an application to be installed, such as a policy for limiting a first permission (hereinafter, Permission1) to operate only in a specified first type of an application. Alternatively, the sharing permission rule information 605 includes a policy for limiting a second permission (hereinafter, Permission2) to be shared only under a specified first condition. The first condition, for example, includes an application having the same package name with package name of an application which is having a specific permission. At least one of the type limitation policy and the permission specific condition of the permission specific application may be adjusted in correspondence to control information received from a user input or an external electronic device.

According to embodiments of the present disclosure, a second application 602 and a third application 603 are installed on the electronic device 100 according to an operation of a user input or a management device such as a server or control device of the electronic device 100. In relation to this, the electronic device 100 receives or stores information, such as program package, relating to the second application 602 and the third application 603.

The first application 601, for example, is a system application that includes an application installed during a manufacturing process or a specified application installed before sale to a user. Alternatively, the system application includes an application other than one received from a specified server device, such as a specified electronic market or a specified carrier service device, or an external electronic device.

According to embodiments of the present disclosure, the system application is an application that cannot be installed on or deleted from the electronic device 100 or is limited such as by requiring a password input. For example, the package name of the first application 601 is abc, and the sharing permission identification information (Shared UID) of the first application is 123. The package name or the sharing permission identification information of the first application 601 may be changed by an application developer, a supplier, a manager installed on the electronic device 100, or a user. The first application 601 has a state of obtaining Permission1 and Permission2.

The second application 602, for example, is a system application having the package name def. The Shared UID of the second application 602 is 123. The second application 602 is in a state in which an additional permission relating to the electronic device 100 is not yet obtained.

The third application 603, for example, is a general application that includes an application provided from a specified server device or a specified external electronic device. Alternatively, the general application is installed on or deleted from the electronic device 100, or is a different type than the system application, such as a music playback application or a camera application downloaded and installed from an electronic market by a user request. The package name of the third application 603 is abc, and the Shared UID of the third application 603 is 123, for example. The third application 603 is in a state that is no obtained an additional permission relating to the electronic device 100 yet.

The second application 602 or the third application 603 suggested in state 610 is installed on the electronic device 100 in correspondence to a user control or a control of an external electronic device. In this case, as shown in state 630, the second application 602 obtains a first permission. For example, since the second application 602 is a system application, a condition relating to Permission1 of the sharing permission rule information 605 is satisfied. The package name of the second application 602 is def which is different from package name abc of the first application 601. Thus, a condition relating to Permission2 of the sharing permission rule information 605 is not satisfied, and the second application 602 does not obtain the second permission.

The third application 603 obtains the second permission. For example, since the third application 603 is a general application, a condition relating to Permission1 of the sharing permission rule information 605 is not satisfied. Accordingly, the third application 603 does not obtain the first permission. The package name of the third application 603 is abc which is identical to the package name of the first application 601. This satisfies a condition relating to the second permission of the sharing permission rule information 605. Accordingly, the third application 603 obtains the second permission.

Figure 7:
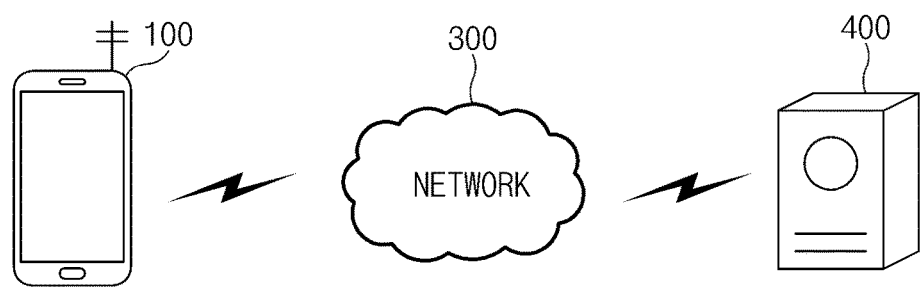
FIG. 7 illustrates an electronic device operating environment according to embodiments of the present disclosure.

FIG. 7 illustrates an electronic device operating environment according to embodiments of the present disclosure.

Referring to FIG. 7, the electronic device operating environment includes an electronic device 100, a network 300, and a server device 400.

At least one application with a specified permission setting is installed on the electronic device 100, which stores and manages the sharing permission information list 206 relating to an application to be installed. The sharing permission information list 206 includes list information of applications for limiting at least part of sharing permission inheritance. The electronic device 100 limits the inheritance of a corresponding application related sharing permission by referring to the sharing permission information list 206 at a specific application installation request.

According to embodiments of the present disclosure, the electronic device 100 receives a new sharing permission information list from the server device 400 through the network 300. The new sharing permission information list includes information in which at least part of a list of applications for limiting at least part of sharing permission is updated. For example, the new sharing permission information list includes information for releasing the sharing permission inheritance limitation of a first application. The new sharing permission information list may alternatively include an inheritance available or unavailable setting of some of a plurality of sharing permissions of the first application, or setting information for limiting at least part of sharing permission of a second application having no sharing limitation installed on the electronic device 100.

The network 300 establishes a communication channel between the electronic device 100 and the server device 400. For example, the network 300 includes at least one of an Internet, mobile communication, and short-range communication network. The network 300 delivers the sharing permission information list to the electronic device 100 at the request of the server device 400 or the electronic device 100.

The server device 400 generates a new sharing permission information list, such as at an update request received from the electronic device 100. Alternatively, the server device 400 generates a new sharing permission information list according to a manager input or at a request of an external electronic device or another server device. The server device 400 transmits the new sharing permission information list to the electronic device 100 through the network 300. The new sharing permission information list includes information in which at least part of a sharing permission inheritance setting of an application installed on the electronic device 100 is changed. The server device 400 includes a control module in relation to the generation of a new sharing permission information list, and a memory for storing a new sharing permission information list. The memory of the server device 400 stores information on connection with the electronic device 100 and information relating to an application installed on the electronic device 100, and includes a communication interface for communicating with the network 300 in relation to the transmission of the generated new sharing permission information list.

Figure 8:
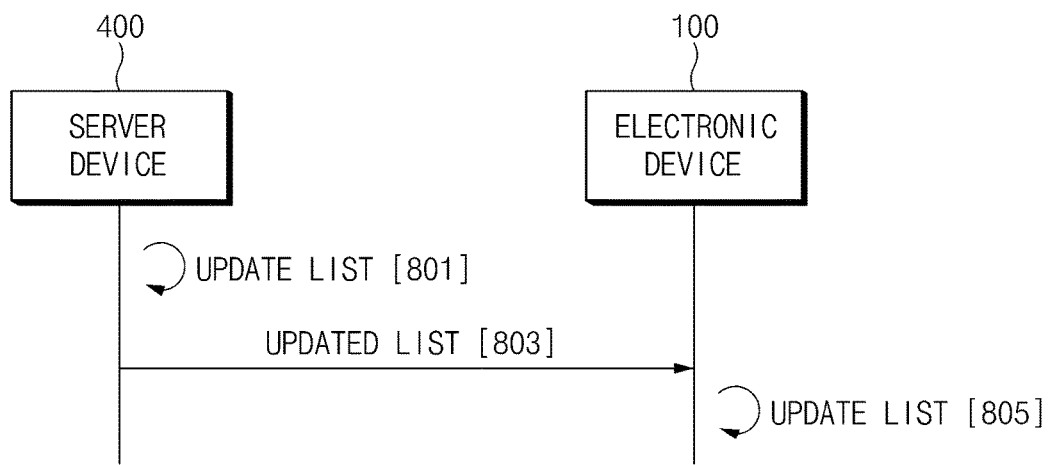
FIG. 8 illustrates a permission remote control according to embodiments of the present disclosure.

FIG. 8 illustrates a permission remote control according to embodiments of the present disclosure.

Referring to FIG. 8, the server device 400 performs list update in step 801. For example, the server device 400 performs the update of a sharing permission information list in correspondence to a specified application related policy change or a permission change request of an application. The server device 400 updates a sharing permission information list at a change request for at least one sharing permission inheritance setting of a specified application, for example.

In step 803, the server device 400 transmits the updated sharing permission information list to the electronic device 100. In relation to this, the server device 400 establishes a communication channel with the electronic device 100 by using the stored information on connection with the electronic device 100. The server device 400 transmits the updated sharing permission information list to the electronic device 100 through a communication channel.

In step 805, the electronic device 100 updates a stored sharing permission information list based on the received update list. When sharing permission information list update is performed, the sharing permission inheritance setting of an application is changed. For example, as the sharing permission inheritance of a specific application is limited, the permission obtained by another application in a sharing permission relationship with the specific application is limited, such as in terms of permission deletion or use unavailability.

In relation to this, when a specific application execution is requested, the electronic device 100 checks a sharing permission information list. The sharing permission inheritance setting of an application in a sharing permission relationship with the execution requested specific application may be checked from the sharing permission information list. The electronic device 100 determines whether there is a permission change of an application according to the confirmed sharing permission inheritance setting. When there is a permission change of an application, the electronic device processes a permission use request based on the changed inheritance setting. During this operation, the electronic device 100 changes permission registration information according to a sharing permission inheritance setting change of the application in the sharing permission relationship. When a permission use request has occurred during application execution, the electronic device 100 processes the permission use request of an application based on changed permission registration information of a corresponding application. Alternatively, the electronic device 100 checks the sharing permission inheritance setting of an application in a sharing permission relationship with an application in execution. The electronic device 100 obtains and processes the permission of an application according to a sharing permission inheritance setting. When an execution requested application is included in a sharing permission information list, the electronic device 100 performs permission use processing according to permission information owned by a corresponding application.

Figure 9:
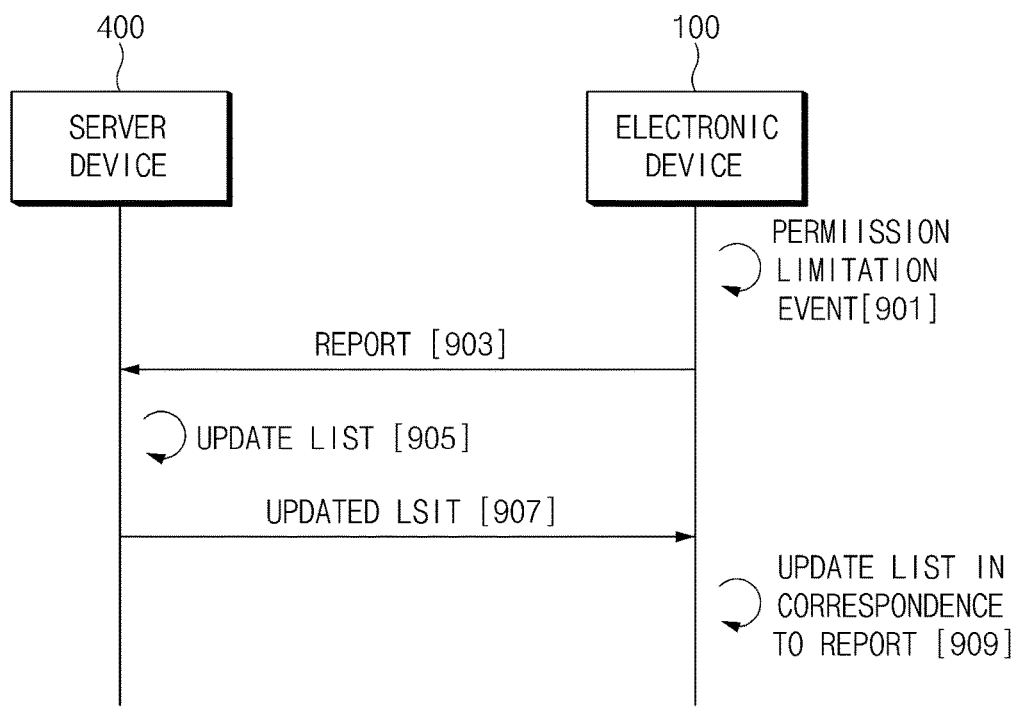
FIG. 9 illustrates another example of a permission remote control according to embodiments of the present disclosure.

FIG. 9 illustrates another example of a permission remote control according to embodiments of the present disclosure.

Referring to FIG. 9, in step 901, a permission limitation event occurs in the electronic device 100. For example, the electronic device 100 receives an event relating to a specified application execution, and performs permission processing based on application related permission registration information at a corresponding application execution request. During this operation, a use request for a use limited sharing permission or a use request for a non-obtained sharing permission occurs during application execution.

Accordingly, the electronic device 100 outputs a permission limitation event, such as a message for stipulating that a corresponding permission cannot be used.

In step 903, the electronic device 100 transmits a report for a permission limitation event to the server device 400. For example, the electronic device 100 determines whether to report corresponding content to the specified server device 400 according to a permission limitation event occurrence. In relation to this, the electronic device 100 outputs a pop-up window indicating this determination, and generates a report for a permission limitation event according to a user input or automatically according to a setting.

For example, the electronic device 100 generates a report including at least one of the identification information of the electronic device 100, limited permission type, application type, and permission limitation event occurrence time information, automatically or according to a user input. The electronic device 100 transmits the generated list to the server device 400 automatically or according to a user input.

In step 905, the server device 400 performs list update. For example, the server device 400 outputs information on report content and performs a sharing permission information list update for changing the sharing permission of an application included in the report content according to a manager control or control information of an external electronic device. In step 907, the server device 400 transmits the updated list to the electronic device 100. In relation to this, the server device 400 stores information on connection with the electronic device 100 that provides the report, and transmits an updated list based on the stored connection information to the electronic device 100. According to embodiments of the present disclosure, the server device 400 provides a sharing permission information list in a message or push form to a plurality of electronic devices, or uploads a sharing permission information list to an electronic market and provides this list at the request of the electronic device 100.

In step 909, the electronic device 100 performs list update based on the received update list and the report. For example, the electronic device 100 updates a sharing permission information list by using the update list. During this operation, the electronic device 100 changes the sharing permission inheritance setting of a reported application based on the updated sharing permission information list. According to this sharing permission inheritance setting change, the electronic device 100 adjusts the permission of another application in a sharing permission relationship with the application.

FIG. 10 illustrates a screen interface of an electronic device according to embodiments of the present disclosure.

Referring to FIG. 10, the electronic device 100, as shown in screen 1001, outputs a sharing limitation application list 1010. For example, the electronic device 100 provides an icon, a menu item, or a search window for searching for a sharing limitation application list 1010. Alternatively, when a new application is installed or an installed application is deleted or updated, the electronic device 100 outputs the sharing limitation application list 1010.

The sharing limitation application list 1010 provides sharing permission inheritance information on at least one application installed on the electronic device 100. For example, a first application has a sharing permission inheritance set to be limited. Accordingly, even when another application in a sharing permission relationship with the first application is installed or operated, the sharing permission owned by the first application is processed not to be inherited (or shared). The second application has a sharing permission inheritance set to be shared. Accordingly, when another application in a sharing permission relationship with the second application is installed or operated, the sharing permission owned by the second application is inherited to the other application. A third application has a sharing permission inheritance set to be partially limited. Accordingly, when another application in a sharing permission relationship with the third application is installed or operated, some of the sharing permissions owned by the third application are inherited to the other application.

The electronic device 100, as shown in screen 1003, outputs a permission limitation list 1030. For example, the electronic device 100 provides an icon or a menu item in relation to the output of the permission limitation list 1030. Alternatively, when a specific item or a permission limitation list view is selected from screen 1001, the electronic device 100 outputs the permission limitation list 1030. The permission limitation list 1030 includes sharing permission information and sharing permission inheritance setting information on at least one application. For example, the first application has a first permission and a sharing (or inheritance) limitation setting state that another application cannot share. The second application has a second permission and a sharing setting state shared by another application. The third application has a third permission and a fourth permission. The third permission is a sharing limitation setting state that is not shared by another application and the fourth permission is a sharing setting state that is shared by another application.

According to embodiments of the present disclosure, at least one of the sharing limitation application list 1010 and the permission limitation list 1030 may be adjusted according to update information provided from an external server device or a user selection. For example, as shown in screen 1005, the sharing limitation application list 1010 is updated and outputted in the form of a sharing limitation application list 1050. The electronic device 100 outputs a sharing limitation application list 1050 according to update list reception and list update. The sharing limitation application list 1050, for example, includes first application information that sharing permission inheritance changes from a limitation setting state into a sharing setting state, second application information that sharing permission inheritance changes from a sharing setting state into a sharing limitation setting state, and third application information that sharing permission inheritance changes from a partial limitation setting state into a limitation setting state comparing with the sharing limitation application list 1010. The inheritance setting change of the sharing permission may be performed according to a policy change of a server device for providing update information or according to a user control.

According to embodiments of the present disclosure, as shown in a screen 1007, the electronic device 100 outputs an updated permission limitation list 1070. The updated permission limitation list 1070 is information that the permission limitation list 1030 is to be changed based on update information. For example, the permission limitation list 1070 includes information indicating that the first permission of the first application changes from a sharing limitation setting state into a sharing setting state and information indicating that the second permission of the second application changes from a sharing setting state into a sharing limitation setting state. The permission limitation list 1070 includes information indicating that the third permission of the third application maintains a sharing limitation setting state and the fourth permission changes from a sharing setting state into a sharing limitation setting state.

Figure 11:
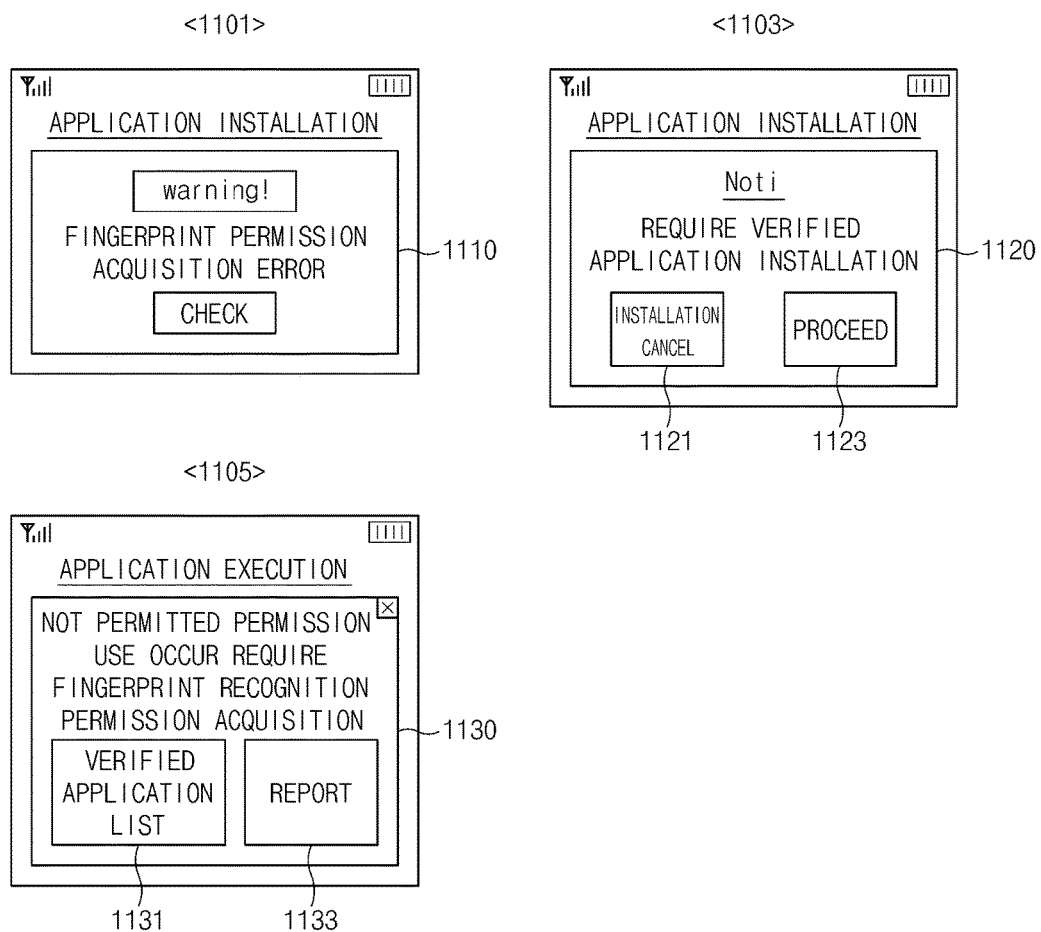
FIG. 11 illustrates another example of a screen interface of an electronic device according to embodiments of the present disclosure.

FIG. 11 illustrates another example of a screen interface of an electronic device according to embodiments of the present disclosure.

Referring to FIG. 11, the electronic device 100, as shown in screen 1101, outputs first guide information 1110 on sharing permission that is not inherited during an application installation process. For example, the sharing permission inheritance setting of the other application is in a limitation setting state even if there is no fingerprint recognition permission among the permissions of another application in a sharing permission relationship with a currently installed application. In this case, the currently installed application does not obtain the fingerprint recognition permission of another application. Accordingly, during an application installation process, the electronic device 100 outputs first guide information 1110 for stipulating that the fingerprint recognition permission acquisition is not performed in a normal manner. The output of the first guide information 1110 is stopped in correspondence to an event occurrence relating to a check selection or an output removal selection.

The electronic device 100, as shown in screen 1103, outputs second guide information 1120 for a function limitation occurring due to a non-inherited sharing permission. For example, when an installed application is set not to obtain the permission of another application in a sharing permission relationship, the electronic device 100 outputs second guide information 1120 for requesting a verified application installation. In relation to this, the electronic device 100 checks a sharing permission inheritance setting state of an application in a sharing relationship with a currently installed application by checking the sharing limitation application list 206a. When the sharing permission inheritance setting state is a limitation setting state, the electronic device 100 performs a control to output the second guide information 1120 including an installation cancel item 1121 and a proceed item 1123. When the installation cancel item 1121 is selected, the electronic device 100 cancels application installation. When the proceed item 1123 is selected, the electronic device 100 continues to proceed with application installation. According to embodiments of the present disclosure, when the installation cancel item 1121 is selected, the electronic device 100 outputs recommendation information of specified another application, such as an application having no additional limitation in relation to permission inheritance.

According to embodiments of the present disclosure, when a not-allowed permission use request has occurred during application execution, the electronic device 100, as shown in screen 1105, outputs third guide information 1130 corresponding to an error occurrence, such as an operation request of a permission not inherited as sharing permission, during a permission operation according to application execution. The third guide information 1130 includes information on a required permission, guide information, such as another application installation or report performance, for obtaining the information, and a verified application list item 1131 and a list item 1133. When the verified application list item 1131 is selected, the electronic device 100 outputs application recommendation information for normally obtaining and processing an error occurring permission. When the report item 1133 is selected, the electronic device 100 reports, to a server device, error occurrence related information, such as the type of permission, the type of an application, error occurrence time information, electronic device identification information, and carrier related information.

As described above, the following are aspects according to embodiments of the present disclosure.

A permission control method includes receiving an application installation or execution request by an processor of an electronic device, checking, by the processor, inheritance limitation information of sharing permission owned by an application in a sharing permission relationship, and processing, by the processor, a sharing permission acquisition of an installed or executed application, based on the inheritance limitation information of sharing permission.

Processing the sharing permission acquisition includes at least one of processing the installed application or the executed application not to obtain sharing permission owned by an application in the sharing permission relationship according to the inheritance limitation information of sharing permission, and processing the installed application or the executed application to obtain part but not all of sharing permission owned by the application in the sharing permission relationship according to the inheritance limitation information of sharing permission.

The method further includes storing at least one of a sharing limitation application list including applications for limiting a sharing permission inheritance and a permission limitation list including permission specific inheritance setting information included in an application.

The method further includes receiving information including an inheritance setting change of sharing permission of an application in a sharing permission relationship, and updating the inheritance limitation information of sharing permission based on the received information.

The method further includes outputting a specified event when a use request not to inherit sharing permission or a limited sharing permission has occurred.

The method further includes transmitting a report for requesting a not to inherit sharing permission update to a specified server device.

The method further includes, when an application in a sharing permission relationship is not included in the inheritance limitation information of sharing permission, registering the installed application or the executed application item in the inheritance limitation information of sharing permission in relation to a sharing permission inheritance limitation of the installed application or the executed application.

Processing the sharing permission acquisition includes, when a type of a permission to be obtained by the installed application or the executed application is a specified first type of a permission, obtaining a permission of the installed application or the executed application without checking the inheritance limitation information of sharing permission.

Processing the sharing permission acquisition includes, when a type of a permission to be obtained by the installed application or the executed application is a specified second type of a permission, obtaining a permission of the installed application or the executed application based on the inheritance limitation information of sharing permission.

Processing the sharing permission acquisition includes, according to a type of the installed application or the executed application, automatically providing a permission requested by the installed application or the executed application or providing permission based on a confirmation relating to the sharing permission inheritance limitation.

Figure 12:
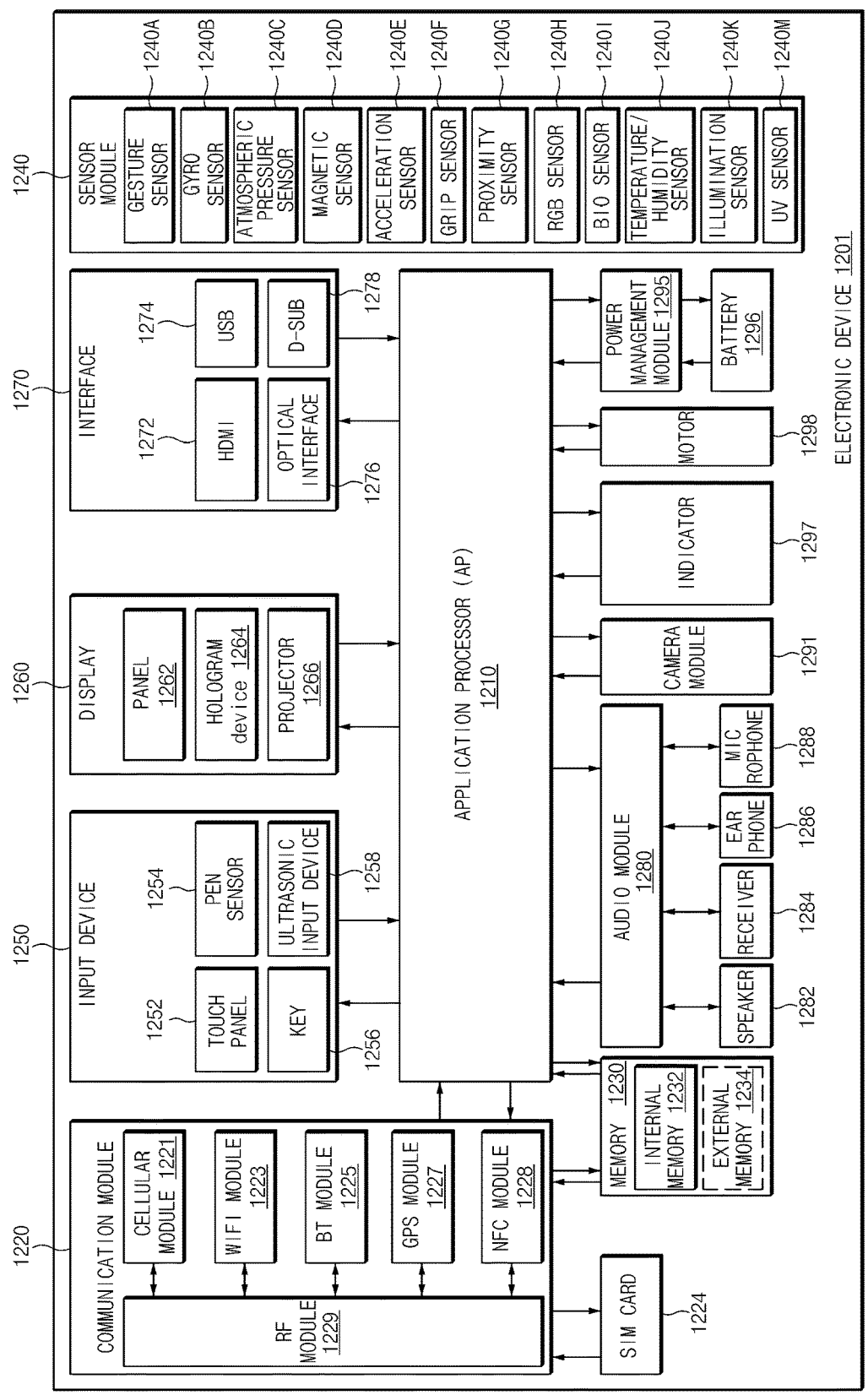
FIG. 12 illustrates an electronic device for supporting a temperature based function control according to embodiments of the present disclosure.

FIG. 12 illustrates an electronic device according to embodiments of the present disclosure.

Referring to FIG. 12, the electronic device 1201 includes application processor (AP) 1210, a communication module 1220, a subscriber identification module (SIM) card 1224, a memory 1230, a sensor module 1240, an input device 1250, a display 1260, an interface 1270, an audio module 1280, a camera module 1291, a power management module 1295, a battery 1296, an indicator 1297, and a motor 1298.

The AP 1210 controls a plurality of hardware or software components connected to the AP 1210 and also performs various data processing and operations by executing an operating system or an application program. The AP 1210 may be implemented with a system on chip (SoC), for example, and may further include a graphic processing unit (GPU) and/or an image signal processor. The AP 1210 includes at least part of the components shown in FIG. 12, loads commands or data received from at least one of other components such as a nonvolatile memory, processes the commands or data and stores various data in the nonvolatile memory.

The communication module 1220 has the same or similar configuration to the communication interface 170 of FIG. 1. The communication module 1220 includes a cellular module 1221, a WiFi module 1223, a Bluetooth® (BT) module 1225, a GPS module 1227, an NFC module 1228, and a radio frequency (RF) module 1229.

The cellular module 1221 provides voice call, video call, text service, or Internet service through a communication network. According to an embodiment of the present disclosure, the cellular module 1221 performs a distinction and authentication operation on an electronic device 1201 in a communication network by using the SIM card 1224. The cellular module 1221 performs at least part of a function that the AP 1210 provides, and further includes a communication processor (CP).

Each of the WiFi module 1223, the BT module 1225, the GPS module 1227, and the NFC module 1228 includes a processor for processing data transmitted/received through a corresponding module. According to an embodiment of the present disclosure, at least one of the cellular module 1221, the WiFi module 1223, the BT module 1225, the GPS module 1227, and the NFC module 1228 may be included in one integrated chip (IC) or IC package.

The RF module 1229, for example, transmits/receives communication signals, such as RF signals. The RF module 1229, for example, includes a transceiver, a power amp module (PAM), a frequency filter, a low noise amplifier (LNA), or an antenna. According to another embodiment of the present disclosure, at least one of the cellular module 1221, the WiFi module 1223, the BT module 1225, the GPS module 1227, and the NFC module 1228 transmits/receives RF signals through a separate RF module.

The SIM card 1224 may include a card including a SIM and/or an embedded SIM and also includes an integrated circuit card identifier (ICCID) or an international mobile subscriber identity (IMSI).

The memory 1230 includes an internal memory 1232 or an external memory 1234. The internal memory 1232 includes at least one of a volatile memory, such as dynamic RAM (DRAM), static RAM (SRAM), and synchronous dynamic RAM (SDRAM), and a non-volatile memory, such as one time programmable read only memory ROM (OTPROM), programmable ROM (PROM), erasable and programmable ROM (EPROM), electrically erasable and programmable ROM (EEPROM), mask ROM, flash ROM, NAND flash memory, and NOR flash memory.

The external memory 1234 further includes a flash drive, such as compact flash (CF), secure digital (SD), micro Micro-SD, Mini-SD, extreme digital (xD), or a memory-stick. The external memory 1234 is functionally and/or physically connected to the electronic device 1201 through various interfaces.

The sensor module 1240 measures physical quantities or detects an operating state of the electronic device 1201, thereby converting the measured or detected information into electrical signals. The sensor module 1240 includes at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H, such as a red, green, blue (RGB) sensor, a biometric sensor 1240I, a temperature/humidity sensor 12403, an illumination sensor 1240K, and an ultra violet (UV) sensor 1240M. Additionally or alternatively, the sensor module 1240 includes an E-nose sensor, an electromyography (EMG) sensor, an electroencephalogram (EEG) sensor, an electrocardiogram (ECG) sensor, an infra red (IR) sensor, an iris sensor, or a fingerprint sensor. The sensor module 1240 further includes a control circuit for controlling at least one sensor therein. According to an embodiment of the present disclosure, the electronic device 1201 further includes a processor configured to control the sensor module 1240 as part of or separately from the AP 1210, and thus controls the sensor module 1240 while the AP 1210 is in a sleep state.

The input device 1250 includes a touch panel 1252, a (digital) pen sensor 1254, a key 1256, and an ultrasonic input device 1258. The touch panel 1252 uses at least one of capacitive, resistive, infrared, or ultrasonic methods, for example, and further includes a control circuit and a tactile layer to provide tactile response to a user.

The (digital) pen sensor 1254 includes a sheet for recognition as part of a touch panel or a separate sheet for recognition. The key 1256 includes a physical button, an optical key, or a keypad, for example. The ultrasonic input device 1258 checks data by detecting sound waves through a microphone 1288 in the electronic device 1201 through an input tool generating ultrasonic signals.

The display 1260 includes a panel 1262, a hologram device 1264, and a projector 1266. The panel 1262 has the same or similar configuration to the display 160 of FIG. 1. The panel 1262 may be implemented to be flexible, transparent, or wearable, for example. The panel 1262 and the touch panel 1252 may be configured with one module. The hologram device 1264 displays three-dimensional images in the air by using the interference of light. The projector 1266 displays an image by projecting light on a screen, which is placed inside or outside the electronic device 1201. According to an embodiment of the present disclosure, the display 1260 further includes a control circuit for controlling the panel 1262, the hologram device 1264, and the projector 1266.

The interface 1270 includes a high-definition multimedia interface (HDMI) 1272, a universal serial bus (USB) 1274, an optical interface 1276, and a D-subminiature (sub) 1278, for example, and may be included in the communication interface 170 shown in FIG. 1. Additionally or alternatively, the interface 1270 includes a mobile high-definition link (MHL) interface, a secure Digital (SD) card/multi-media card (MMC) interface, or an infrared data association (IrDA) standard interface.

The audio module 1280 converts sound into electrical signals and converts electrical signals into sounds. At least some components of the audio module 1280, for example, may be included in the input/output interface 150 shown in FIG. 1. The audio module 1280 processes sound information inputted/outputted through a speaker 1282, a receiver 1284, an earphone 1286, or the microphone 1288.

The camera module 1291, as a device for capturing a still image and a video, includes at least one image sensor, a lens, an image signal processor (ISP), or a flash, such as an LED or a xenon lamp.

The power management module 1295 manages the power of the electronic device 1201, and includes a power management IC (PMIC), a charger IC, or a battery gauge, for example. The PMIC may have a wired and/or wireless charging method including magnetic resonance, magnetic induction, or an electromagnetic method. An additional circuit for wireless charging may be added, such as a coil loop circuit, a resonant circuit, or a rectifier circuit. The battery gauge measures the remaining amount of the battery 1296, or a voltage, current, or temperature thereof during charging. The battery 1296 may be a rechargeable and/or solar battery, for example.

The indicator 1297 displays a specific state of the electronic device 1201 or part thereof, such as a booting state, message, or charging state. The motor 1298 converts electrical signals into mechanical vibration and generates vibration or haptic effect. Although not shown in the drawings, the electronic device 1201 includes a processing device, such as a graphic processing unit (GPU) for mobile TV support. A processing device for mobile TV support processes media data according to standards such as digital multimedia broadcasting (DMB), digital video broadcasting (DVB), or mediaFLO™.

Each of the above-mentioned components of the electronic device according to embodiments of the present disclosure may be configured with at least one component and the name of a corresponding component may vary according to the type of an electronic device. An electronic device according to embodiments of the present disclosure includes at least one of the above-mentioned components, may not include some of the above-mentioned components, or may further include another component. Some of components in an electronic device according to embodiments of the present disclosure are configured as one entity, so that functions of previous corresponding components are performed identically.

Figure 13:
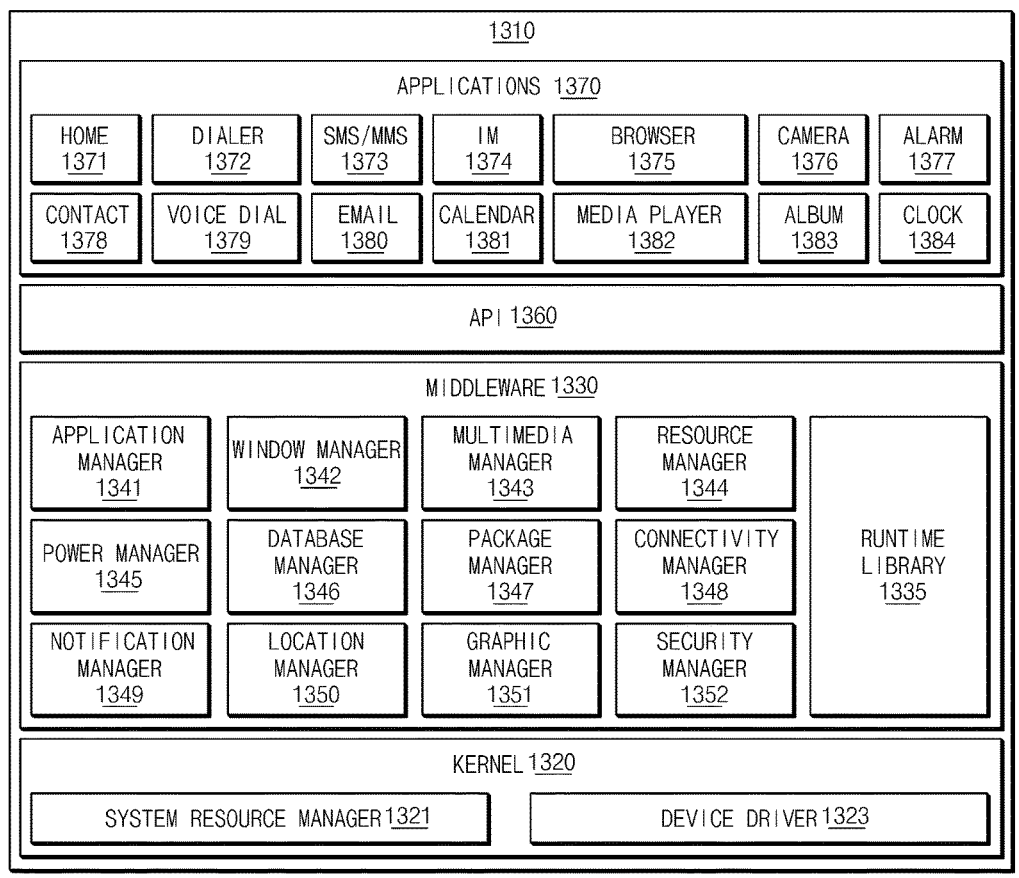
FIG. 13 is a block diagram illustrating a program module according to embodiments of the present disclosure.

FIG. 13 is a block diagram illustrating a program module according to embodiments of the present disclosure.

Referring to FIG. 13, the program module 1310 includes an OS for controlling a resource relating to an electronic device and/or various applications running on the OS. The OS, for example, includes android, iOS, windows, symbian, tizen, or bada.

The OS of the program module 1310 includes applications 1370, a kernel 1320, middleware 1330, and an API 1360. At least part of the program module 1310 may be preloaded on an electronic device or downloaded from a server.

The kernel 1320 includes a system resource manager 1321, and a device driver 1323. The system resource manager 1321 performs the control, allocation, or retrieval of a system resource, and includes a process management unit, a memory management unit, or a file system management unit. The device driver 1323 may be, for example, a display, camera, BT, sharing memory, universal serial bus (USB), keypad, WiFi. audio, or inter-process communication (IPC) driver.

The middleware 1330 provides a function that the applications 1370 commonly require, or provides various functions to the applications 1370 through the API 1360 in order to allow the applications 1370 to efficiently use a limited system resource inside the electronic device. The middleware 1330 includes at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, and a security manager 1352.

The runtime library 1335 includes a library module that a complier uses to add a new function through a programming language while the applications 1370 are running. The runtime library 1335 performs a function on input/output management, memory management, or arithmetics.

The application manager 1341 manages the life cycle of at least one application among the applications 1370. The window manager 1342 manages a GUI resource used in a screen. The multimedia manager 1343 recognizes a format for playing various media files and encodes or decodes a media file by using the codec corresponding to a corresponding format. The resource manager 1344 manages a resource such as a source code, a memory, or a storage space of at least one of the applications 1370.

The power manager 1345 operates together with a basic input/output system (BIOS) to manage the battery or power and provides power information necessary for an operation of the electronic device. The database manager 1346 creates, searches, or modifies a database used in at least one application among the applications 1370. The package manager 1347 manages the installation or update of an application distributed in a package file format.

The connectivity manager 1348 manages a wireless connection such as WiFi or Bluetooth™. The notification manager 1349 displays or notifies an event such as arrival messages, appointments, and proximity alerts to a user in a manner that does not interrupt the user. The location manager 1350 manages location information on an electronic device. The graphic manager 1351 manages a graphic effect to be provided to a user or a user interface relating thereto. The security manager 1352 provides various security functions necessary for system security or user authentication. According to an embodiment of the present disclosure, when an electronic device includes a phone function, the middleware 1330 further includes a telephony manager for managing a voice or video call function of the electronic device.

The middleware 1330 includes a middleware module for forming a combination of various functions of the above-mentioned components, provides a module specialized for each type of OS to provide differentiated functions, and deletes part of existing components or adds new components dynamically.

The middleware 1339 includes permission processing related modules. For example, the middleware 1330 processes a sharing permission inheritance limitation of at least one of a preloaded application and an application received from a server or an external electronic device and installed. In relation to this, the middleware 1330 determines the application for which at least part of sharing permission is set for sharing permission inheritance limitation according to the type of an application or the type of permission based on predefined policy information, or policy information provided from a server device or an external electronic device. Alternatively, the middleware 1330 supports a screen interface output relating to a sharing permission inheritance limitation setting and sets the sharing permission inheritance limitation of a specified application or a specified permission in correspondence to a user selection or control information of a server device. The middleware 1330 processes a limited sharing permission not to be obtained when an application in a sharing permission relationship is installed, or processes sharing permission obtained when an application in a sharing permission relationship is installed not to be used based on at least one of a sharing limitation application list, a permission limitation list, and permission registration information.

According to embodiments of the present disclosure, when update information of at least one of a sharing permission information list, a sharing limitation application list, and a permission limitation list relating to a sharing permission inheritance setting is received, the middleware 1330 adjusts a sharing permission inheritance setting according to the received information. Based on this, the middleware 1330 performs processing to obtain an application in a sharing permission relationship by adjusting the sharing permission of an application having sharing permission set to not be inherited. Alternatively, when the sharing permission obtained by a sharing permission inheritance is updated not to be used, the middleware 1330 limits the permission operation according to corresponding update information.

The API 1360, for example, as a set of API programming functions, may be provided as another configuration according to the OS. For example, in the case of android or iOS, one API set may be provided for each platform and in the case Tizen, at least two API sets may be provided for each platform.

The applications 1370 include a home 1371, dialer 1372, short message service/multimedia messaging service (SMS/MMS) 1373, instant message 1374, browser 1375, camera 1376, alarm 1377, contact 1378, voice dial 1379, e-mail 1380, calendar 1381, media player 1382, album 1383, clock 1384, and health care such as an exercise amount or blood sugar, or environmental information provision, such as provide air pressure, humidity, or temperature information applications.

According to an embodiment of the present disclosure, the applications 1370 include an application (hereinafter, "information exchange application") for supporting information exchange between the electronic device and an external electronic device. The information exchange application, for example, includes a notification relay application for relaying specific information to the external device or a device management application for managing the external electronic device.

For example, the notification relay application may have a function for relaying, to an external electronic device, notification information occurring from another application of the electronic device. The notification relay application receives notification information from an external electronic device and provides the received notification information to a user. The device management application, for example, manages at least one function of the external electronic device or the brightness or resolution adjustment of a display of an external electronic device communicating with the electronic device, an application operating in the external electronic device, or a service such as a call or message service provided from the external device.

According to an embodiment of the present disclosure, the application 1330 includes a specified application according to the property of the external electronic device. According to an embodiment of the present disclosure, the applications 1370 are received from an external electronic device and include a preloaded application or a third party application downloadable from a server. The names of components in the program module 1310 according to the shown embodiment may vary depending on the type of OS.

According to embodiments of the present disclosure, at least part of the program module 1310 may be implemented with software, firmware, hardware, or a combination thereof. At least part of the programming module 1310, for example, may be implemented by a processor and includes a module, program, routine, sets of instructions, or a process to perform at least one function.

According to the above-mentioned embodiments of the present disclosure, by limiting sharing permission, a security issue by an unspecified application or function may be processed fundamentally.

Each of the above-mentioned components of the electronic device according to embodiments of the present disclosure may be configured with at least one component and the name of a corresponding component may vary according to the type of an electronic device. According to embodiments of the present disclosure, an electronic device according to embodiments of the present disclosure may or may not include some of the above-mentioned components, or may further include another component. Some of components in an electronic device according to embodiments of the present disclosure are configured as one entity, so that functions of previous corresponding components are performed identically.

The term "module" used in embodiments of the present disclosure, for example, may indicate a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to embodiments of the present disclosure includes at least one of an application-specific integrated circuit (ASIC) chip performing certain operations, field-programmable gate arrays (FPGAs), or a programmable-logic device, all of which are known or to be developed in the future.

According to embodiments of the present disclosure, at least part of a device or a method according to this disclosure, such as in a form of a programming module, may be implemented using an instruction stored in computer-readable storage media. When at least one processor executes an instruction, the processor performs a function corresponding to the instruction. The non-transitory computer-readable storage media includes the memory 130, for example.

The non-transitory computer-readable storage media includes hard disks, floppy disks, magnetic media, optical media, such as compact disc-read only memory (CD-ROM) and a digital versatile disk (DVD), magneto-optical media, and hardware devices including ROM, RAM, or flash memory. A program instruction includes high-level language code executable by a computer using an interpreter in addition to machine code created by a complier. The hardware device may be configured to operate as at least one software module to perform an operation of embodiments of the present disclosure and vice versa.

A module or a programming module according to embodiments of the present disclosure includes at least one of the above-mentioned components, may not include some of the above-mentioned components, or further includes another component. Operations performed by a module, a programming module, or other components according to embodiments of the present disclosure may be executed through a sequential, parallel, repetitive or heuristic method. Some operations may be executed in a different order or may be omitted, and other operations may be added.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

Although certain embodiments are described herein, it will be understood by those skilled in the art that various changes in form and detail may be made therein without departing from the spirit and scope of the embodiments, as defined by the appended claims.

What is claimed is:

1. An electronic device comprising:
   a memory configured to store inheritance limitation information of sharing permission owned by a first application; and
   a processor functionally connected to the memory that, upon executing computer executable instructions stored on the memory, performs operations comprising:
   processing a sharing permission acquisition of an installed or executed second application, based on the inheritance limitation information of the sharing permission owned by the first application,
   storing a sharing limitation application list including applications for limiting a sharing permission inheritance,
   registering the installed or executed second application in relation to the inheritance limitation information when the sharing limitation application list does not include the first application in a sharing permission relationship, and
   processing the installed or executed second application to obtain the sharing permission owned by the first application except for part of the sharing permission specified in the inheritance limitation information of the sharing permission as being limited for the installed or executed second application,
   wherein the first application has the sharing permission relationship with the installed or executed second application.

2. The electronic device of claim 1, wherein the processor, upon executing the computer instructions stored on the memory, further performs processing the installed or executed second application not to obtain the sharing permission owned by the first application in response to the inheritance limitation information of the sharing permission.

3. The electronic device of claim 2, wherein the processor, upon executing the computer instructions stored on the memory, further performs storing a permission limitation list including permission specific inheritance setting information included in the first application.

4. The electronic device of claim 1, wherein the processor, upon executing the computer instructions stored on the memory, further performs updating the inheritance limitation information of the sharing permission in correspondence to received information including an inheritance setting change of the sharing permission of the first application in the sharing permission relationship.

5. The electronic device of claim 1, wherein the processor, upon executing the computer instructions stored on the memory, further performs outputting a specified event when a use request not to inherit the sharing permission or a limited sharing permission has occurred.

6. The electronic device of claim 1, wherein the processor, upon executing the computer instructions stored on the memory, further performs transmitting a report for requesting an update not to inherit the sharing permission to a specified server device.

7. The electronic device of claim 1, wherein, when the first application having the relationship does not have the inheritance limitation information of the sharing permission, the processor, upon executing the computer instructions stored on the memory, further performs registering the installed or executed second application in the inheritance limitation information of the sharing permission.

8. The electronic device of claim 1, wherein, when a type of permission to be obtained by the installed or executed second application is a specified first type, the processor, upon executing the computer instructions stored on the memory, further performs obtaining the permission of the installed or executed second application without determining the inheritance limitation information of the sharing permission.

9. The electronic device of claim 1, wherein, when a type of permission to be obtained by the installed or executed second application is a specified second type, the processor, upon executing the computer instructions stored on the memory, further performs obtaining the permission of the installed or executed second application based on the inheritance limitation information of the sharing permission.

10. The electronic device of claim 1, wherein, according to a type of the installed or executed second application, the processor, upon executing the computer instructions stored on the memory, further performs automatically providing permission requested by the installed or executed second application or providing the permission based on confirmation of the inheritance limitation information of the sharing permission.

11. A permission control method comprising:
    receiving an application installation or execution request by a processor of an electronic device;
    determining, by the processor, inheritance limitation information of sharing permission owned by a first application in a sharing permission relationship;
    processing, by the processor, a sharing permission acquisition of an installed or executed second application, based on the inheritance limitation information of the sharing permission;
    storing a sharing limitation application list including applications for limiting a sharing permission inheritance;
    registering the installed or executed second application in relation to the inheritance limitation information when the sharing limitation application list does not include the first application in the sharing permission relationship; and
    processing the installed or executed second application to obtain the sharing permission owned by the first application except for part of the sharing permission specified in the inheritance limitation information of the sharing permission as being limited for the installed or executed second application,
    wherein the first application has the sharing permission relationship with the installed or executed second application.

12. The method of claim 11, wherein processing the sharing permission acquisition comprises:
    processing the installed or executed second application not to obtain the sharing permission owned by the first application in the sharing permission relationship in response to the inheritance limitation information of the sharing permission.

13. The method of claim 12, further comprising storing a permission limitation list including permission specific inheritance setting information included in the first application.

14. The method of claim 11, further comprising:
receiving information including an inheritance setting change of the sharing permission of the first application in the sharing permission relationship; and
updating the inheritance limitation information of the sharing permission based on the received information.

15. The method of claim 11, further comprising outputting a specified event when a use request not to inherit the sharing permission or a limited sharing permission has occurred.

16. The method of claim 11, further comprising transmitting a report to a specified server device, wherein the report is related to an update request not to inherit the sharing permission.

17. The method of claim 11, further comprising, when the first application in the sharing permission relationship is not included in the inheritance limitation information of the sharing permission, registering the installed or executed second application in the inheritance limitation information of the sharing permission in relation to a sharing permission inheritance limitation of the installed or executed second application.

18. The method of claim 11, wherein processing the sharing permission acquisition comprises, when a type of the permission to be obtained by the installed or executed second application is a specified first type, obtaining the permission of the installed or executed second application without determining the inheritance limitation information of the sharing permission.

19. The method of claim 11, wherein processing the sharing permission acquisition comprises, when a type of the permission to be obtained by the installed or executed second application is a specified second type, obtaining the permission of the installed or executed second application based on the inheritance limitation information of the sharing permission.

20. The method of claim 11, wherein processing the sharing permission acquisition comprises, according to a type of the installed or executed second application, automatically providing permission requested by the installed or executed second application or providing the permission based on a confirmation relating to the sharing permission inheritance limitation.

* * * * *